(12) United States Patent
Behl et al.

(10) Patent No.: US 7,906,452 B2
(45) Date of Patent: Mar. 15, 2011

(54) INK FOR PRODUCING CATALYST LAYERS

(75) Inventors: Walter Behl, Blankenbach (DE); Marco Lopez, Frankfurt (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 491 days.

(21) Appl. No.: 11/909,767

(22) PCT Filed: Mar. 25, 2006

(86) PCT No.: PCT/EP2006/002751
§ 371 (c)(1),
(2), (4) Date: Feb. 6, 2008

(87) PCT Pub. No.: WO2006/103035
PCT Pub. Date: Oct. 5, 2006

(65) Prior Publication Data
US 2008/0191161 A1    Aug. 14, 2008

(30) Foreign Application Priority Data
Mar. 30, 2005 (EP) ..................... 05006903

(51) Int. Cl.
| | |
|---|---|
| B01J 23/40 | (2006.01) |
| B01J 23/74 | (2006.01) |
| B01J 31/00 | (2006.01) |
| B01J 21/18 | (2006.01) |
| B01J 23/00 | (2006.01) |
| H01M 4/02 | (2006.01) |
| H01M 4/36 | (2006.01) |
| H01M 4/92 | (2006.01) |
| H01M 4/94 | (2006.01) |
| H01M 4/90 | (2006.01) |

(52) U.S. Cl. ......... 502/185; 502/150; 502/168; 502/172; 502/180; 502/182; 429/523; 429/524; 429/525; 429/526

(58) Field of Classification Search .................. 502/150, 502/168, 172, 173, 180, 182, 185; 429/40–44, 429/523–526
See application file for complete search history.

(56) References Cited

U.S. PATENT DOCUMENTS
3,442,715 A * 5/1969 Yee et al. .................. 502/4
5,716,437 A * 2/1998 Denton et al. ............. 106/31.92
(Continued)

FOREIGN PATENT DOCUMENTS
DE    44 43 701 C1    8/1996
(Continued)

OTHER PUBLICATIONS
Written Opinion for PCT/EP06/02751.*
(Continued)

Primary Examiner — Patricia L Hailey
(74) Attorney, Agent, or Firm — Levin Santalone LLP; John Santalone

(57) ABSTRACT

The invention relates to an ink for producing catalyst layers for electrochemical devices. The ink comprises catalyst material, ionomer material, water and at least one organic solvent. The organic solvent belongs to the class of tertiary alcohol's and/or the class of aliphatic diketones and bears functional groups which are stable to oxidative degradation in the ink. This prevents formation of decomposition products in the ink. The ink of the invention displays a high storage stability and is used for producing catalyst-coated substrates for electrochemical devices, in particular fuel cells (PEMFCs, DMFCs).

16 Claims, 1 Drawing Sheet

U.S. PATENT DOCUMENTS

| | | | |
|---|---|---|---|
| 5,861,222 | A | 1/1999 | Fischer et al. |
| 5,869,416 | A | 2/1999 | Mussell |
| 6,844,286 | B2 * | 1/2005 | Kohler et al. ............ 502/101 |
| 7,419,740 | B2 * | 9/2008 | Binder et al. ............ 429/40 |
| 2002/0034674 | A1 * | 3/2002 | Starz et al. ............ 429/40 |
| 2003/0059666 | A1 | 3/2003 | Kourtakis |
| 2003/0078157 | A1 * | 4/2003 | Matsuoka et al. ........ 502/101 |
| 2004/0023105 | A1 * | 2/2004 | Hohenthanner et al. ...... 429/44 |
| 2005/0026029 | A1 * | 2/2005 | Kawai et al. ............ 429/42 |
| 2005/0064276 | A1 * | 3/2005 | Sugawara et al. ........ 429/42 |

FOREIGN PATENT DOCUMENTS

| | | |
|---|---|---|
| EP | 309337 A1 | 3/1989 |
| EP | 622861 B1 | 11/1994 |
| EP | 731520 A1 | 11/1996 |
| EP | 743092 A1 | 11/1996 |
| EP | 785588 A2 | 7/1997 |
| EP | 797265 B1 | 9/1997 |
| EP | 945910 A2 | 9/1999 |
| EP | 1 378952 A1 | 1/2004 |
| JP | 2003 208903 | 7/2003 |
| JP | 2003-208903 * | 7/2003 |
| WO | WO 03/036748 A2 | 5/2003 |
| WO | WO 03/061931 A2 | 7/2003 |
| WO | WO 03/063280 A2 | 7/2003 |
| WO | WO 03/073540 A2 | 9/2003 |
| WO | WO 2004/054021 A2 | 6/2004 |
| WO | WO 2005/001978 A2 | 1/2005 |

OTHER PUBLICATIONS

PCT Request dated Mar. 25, 2006; International Search Report mailed Jun. 20, 2006; and Written Opinion of the ISA mailed Jun. 20, 2006.

* cited by examiner

INK FOR PRODUCING CATALYST LAYERS

The present invention relates to an ink for producing catalyst layers for electrochemical devices. A catalyst ink which contains at least one organic solvent having functional groups or substituents which are stable to oxidative degradation is described. The ink is used in the production of catalyst layers and electrodes for electrochemical devices, in particular for fuel cells, membrane fuel cells (PEMFCs, DMFCs), electrolyzers or sensors.

Fuel cells convert a fuel and an oxidant at separate locations at two electrodes into electric power, heat and water. As fuel, it is possible to use hydrogen, a hydrogen-rich gas or methanol, while oxygen or air serves as oxidant. The process of energy conversion in the fuel cell has a particularly high efficiency. For this reason, fuel cells (PEMFCs, SOFCs, etc) are becomingly increasingly important for mobile, stationary and portable applications. Membrane fuel cells (PEMFCs, DMFCs, etc.) are particularly suitable for use in the above-mentioned fields because of their compact construction, their power density and their high efficiency.

The key component of a PEM fuel cell is the membrane-electrode assembly (MEA). The membrane-electrode assembly has a sandwich-like structure and generally comprises five layers.

Figure 1:
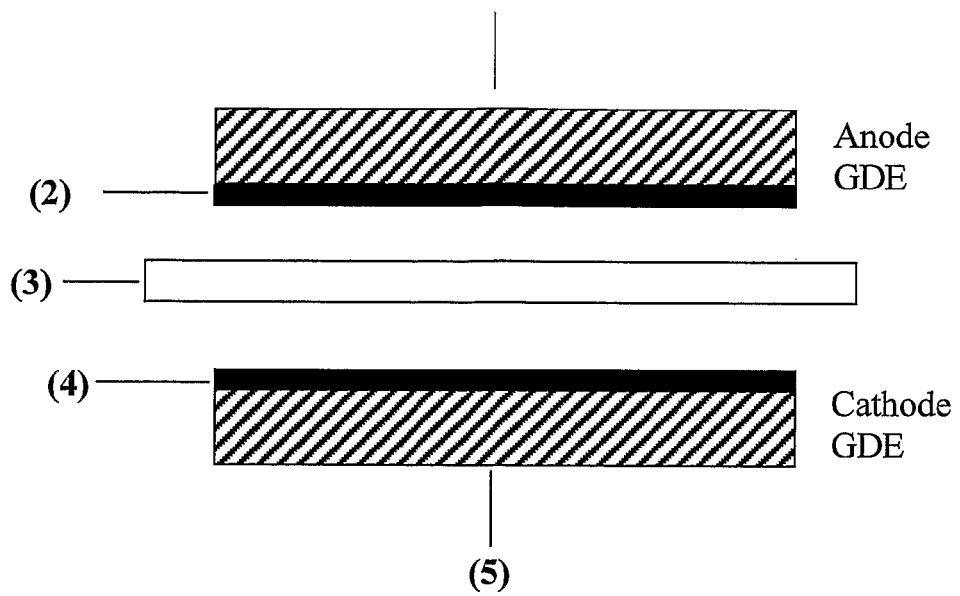

A schematic structure of a five-layer membrane-electrode assembly is shown in FIG. 1. Here, the anode gas diffusion layer (1) together with the anode catalyst layer (2) forms the gas diffusion electrode (GDE) on the anode side; the cathode gas diffusion layer (5) together with the cathode catalyst layer (4) forms the gas diffusion electrode (GDE) on the cathode side. The ionomer membrane (3) is located between the two GDEs.

Figure 2:
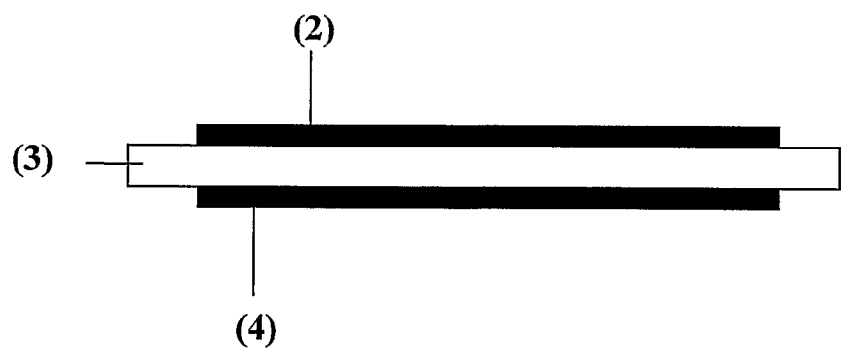

The structure of a three-layer catalyst-coated membrane (CCM) is shown in FIG. 2. Here, the catalyst layers (2) and (4) are applied directly to the membrane (3).

In the production of a five-layer MEA, it is usual to apply two catalyst-coated gas diffusion layers (or gas diffusion electrodes, GDEs) to the front side and the rear side of an ionomer membrane (3) and press them together to produce an MEA. However, processes for producing MEAs using catalyst-coated ionomer membranes (CCMs) are also known. In this case, the CCMs are generally combined with the gas diffusion layers (1) and (5) which have not been coated with catalyst.

The present invention describes novel catalyst-containing inks and pastes which can be used for coating various substrates (e.g. ionomer membranes, gas diffusion layers, carbon fibre nonwovens, polymer films, release films, etc.). Such coated substrates are, for example, used for producing electrodes or membrane-electrode assemblies for fuel cells.

Various compositions for catalyst inks are known from the patent literature.

Thus, EP 797 265 B1 describes an ink for producing membrane-electrode assemblies for fuel cells. Solvents used are isopropanol and glycerol.

U.S. Pat. No. 5,869,416 describes alkylene carbonates, for example propylene carbonate, as solvents for catalyst inks.

EP 622 861 B1 discloses electrode inks containing alkoxy propanols or aryloxypropanols as organic solvents.

EP 945 910 A2 describes inks comprising two immiscible organic solvents A and B. As solvents A, use is made of monohydric or polyhydric alcohols, glycols, glycol ether alcohols, glycol ethers and mixtures thereof. The solvents B are nonpolar hydrocarbons or slightly polar solvents. Tertiary alcohols are not described.

EP 309 337 A1 discloses an electrode ink containing alcohols and water. The ionomer is dissolved in a mixture of water and ethanol, or isopropanol.

EP 785 588 A2 describes electrode inks containing sublimable pore formers. Cyclohexanol is used as alcoholic solvent.

EP 731 520 A1 teaches an ink comprising a catalyst, ionomer and solvent, with water being used as solvent. This ink contains no further organic components apart from the ionomer.

Furthermore, EP 945 910 A2 discloses catalyst inks containing linear dialcohols (e.g. ethylene glycol, propylene glycol) and water.

WO 2004/054021 describes inks which comprise polar aprotic organic solvents.

Inks which contain primary and/or secondary alcohols (e.g. alkanediols, glycols or glyercol) as solvents have fundamental disadvantages; in particular, they have an unsatisfactory stability. The primary or secondary OH groups gradually react in the ink in the presence of the catalyst and are subject to oxidative attack or degradation in the presence of atmospheric oxygen (for which even traces suffice). They can in this way be oxidized further to, for example, aldehydes, ketones and carboxylic acids. This oxidation process can lead to various degradation products in the ink.

The oxidative degradation of alkanediols is known from the literature. The secondary or primary alcohol groups are in this case oxidized first. In further stages, these intermediates can then be oxidized to, for example, oxalic acid ($C_2H_2O_4$), lactic acid ($C_3H_6O_3$), pyruvic aldehyde ($C_3H_4O_2$) or pyruvic acid ($C_3H_4O_3$), and autocondensation can finally occur to form carbon dioxide, carbon monoxide and acetic acid.

The organic acids formed in this decomposition process can, like their salts, remain in the catalyst layer or on the surface of the catalyst. They can lead to a deterioration in performance of the catalyst layer or the membrane-electrode assembly and may have to be removed from the catalyst layers by labourious cleaning processes.

Furthermore, the oxidation process described can influence the storage stability of the catalyst inks and cause a change in the viscosity of the ink during storage.

It was therefore an object of the present invention to provide a catalyst ink which has a high stability in respect of decomposition reactions and a good storage stability. The formation of degradation or decomposition products in the ink should be prevented. The catalyst layers produced therewith should have a high performance. The ink should considerably simplify the production process for electrodes and make post-treatment and cleaning steps for the electrode layers superfluous. Depending on the coating methods selected, the ink solvents should be miscible with water and/or the ionomer solution, have an appropriate boiling point and a suitable evaporation number (EN).

The ink of the invention comprises the catalyst material together with ionomer material, water and at least one organic solvent bearing functional groups which are stable to oxidative degradation in the ink.

In a first embodiment, the organic solvent of the catalyst ink is selected from the class of tertiary alcohols having the general formula $$R^1(R^2)C(OH)R^3$$

where
$R^1$=methyl, ethyl, propyl, isopropyl, butyl, isobutyl, tert-butyl, $CH_3(CH_3)C(OH)$—, $CH_3(CH_3)C(OH)$—$CH_2$—, $CH_3(CH_3)C(OH)$—$CH_2$—$CH_2$—, $CH_3$—O—, $C_2H_5$—O—, $C_3H_7$—O—, phenyl-O—, benzyl-O—, 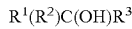$CH_3$—O—

CH$_2$—, C$_2$H$_5$—O—CH$_2$—, C$_3$H$_7$—O—CH$_2$—, CH$_3$—CH(CH$_3$)—O—CH$_2$—, phenyl-O—CH$_2$—, benzyl-O—CH$_2$—, CH$_3$(C=O)—CH$_2$—, CH$_3$(C=O)—CH$_2$—CH$_2$—, CH$_3$—CH$_2$(C=O)—CH$_2$—, CH$_3$—O(C=O)—CH$_2$—, CH$_3$CH$_2$—O(C=O)—CH$_2$—, HSO$_3$—, HSO$_3$—CH$_2$—, HSO$_3$—CH$_2$—CH$_2$—, R$^2$=methyl, ethyl, propyl, isopropyl, butyl, isobutyl, —CH$_2$—O—CH$_3$ and R$^3$=methyl, ethyl, propyl, isopropyl, butyl, isobutyl, tert-butyl, CH$_3$(CH$_3$)C(OH)—, CH$_3$(CH$_3$)C(OH)—CH$_2$—, CH$_3$(CH$_3$)C(OH)—CH$_2$—CH$_2$—, CH$_3$—O—, C$_2$H$_5$—O—, C$_3$H$_7$—O—, phenyl-O—, benzyl-O—, CH$_3$—O—CH$_2$—, C$_2$H$_5$—O—CH$_2$—, C$_3$H$_7$—O—CH$_2$—, CH$_3$—CH(CH$_3$)—O—CH$_2$—, phenyl-O—CH$_2$—, benzyl-O—CH$_2$—, CH$_3$(C=O)—CH$_2$—, CH$_3$(C=O)—CH$_2$—CH$_2$—, CH$_3$—CH$_2$(C=O)—CH$_2$—CH$_3$—O(C=O)—CH$_2$—, CH$_3$CH$_2$—O(C=O)—CH$_2$—, HSO$_3$—, HSO$_3$—CH$_2$—, HSO$_3$—CH$_2$—CH$_2$—.

It is also possible to use mixtures of these solvents.

Preferred solvents from the class of tertiary alcohols are, for example, tert-butanol, 2-methyl-2-butanol, 2-methyl-2-pentanol, 2,3-dimethyl-2-butanol, 2,3-dimethyl-2,3-butanediol, 2,4-dimethyl-2,4-pentanediol, 2,4-dimethyl-2,4-hexanediol, 2,5-dimethylhexan-2,5-diol, 3-hydroxy-3-methyl-2-butanone and 4-hydroxy-4-methyl-2-pentanone (diacetone alcohol) and mixtures thereof.

It has surprisingly been found that solvents from the class of tertiary alcohols are stable to oxidative degradation in the presence of the catalyst in the ink.

Tertiary alcohols substituted by further functional groups have also been found to be useful. The skeleton of the tertiary alcohol can be modified in a targeted manner by the introduction of further suitable functional groups which should likewise be stable to oxidative attack. Suitable polar functional groups are ether (or alkoxy) groups (—O—R), keto groups (R—(C=O)—R), ester groups (R—COOR) or sulphonic acid groups (R—SO$_3$H).

The introduction of such additional functional groups enables the parameters polarity, solubility, miscibility with water, vapour pressure and evaporation number (EN) of the tertiary alcohol to be adjusted. At the same time, the hydrophilic OH group of the solvent molecule is retained, as a result of which good compatibility with water and the ionomer material in the ink is achieved.

In addition, further tertiary alcohol groups in the solvent molecule are also possible, since these are likewise stable to oxidation. Such diols or triols having two or three tertiary alcohol groups in the molecule likewise give good results.

In a second embodiment, the catalyst ink of the invention comprises at least one organic solvent having two keto groups (R—(C=O)—R) in the molecule (diketones). It has been found that the keto groups of these solvents are likewise stable to oxidative degradation in the ink. Aliphatic diketones, which have a degree of miscibility and compatibility with water and the ionomer, are particularly useful.

Examples of suitable solvents from the class of aliphatic diketones are 2,3-butanedione(diacetyl), 2,3-pentanedione (ethylmethylglyoxal), 2,4-pentanedione(acetylacetone), 2,3-hexanedione, 2,4-hexanedione, 3,4-hexanedione, 2,5-hexanedione, 2,6-heptanedione, 3-methyl-2,5-hexanedione and 3-ethyl-2,5-hexanedione and mixtures thereof.

The aliphatic diketones can also be used in mixtures with the abovementioned tertiary alcohols.

Generally, the ink solvents of the present invention (tertiary alcohols, aliphatic diketones or mixtures thereof) should be miscible with water, preferably they should be completely miscible with water. Furthermore, the ink solvents should be miscible with the solvents of the liquid ionomer compositions used.

Catalyst inks which contain the solvents according to the invention (tertiary alcohols or aliphatic diketones or mixtures thereof) have a good long-term stability. The viscosity of the inks is retained during storage over a relatively long period, i.e. over a number of weeks or months, and the catalytic activity of the catalyst is not impaired by degradation products in the ink. Subsequent processes for decontamination of the electrodes or the catalyst-coated membranes can be dispensed with.

In addition, the catalyst inks display very good processing properties in spray application and screen printing. They can also be used in decal or transfer processes.

Catalyst layers, electrodes and MEAs produced using the catalyst inks of the invention display good electrical performance values in a PEM fuel cell.

The organic solvents used according to the invention are present in the catalyst ink in amounts of from 1 to 90% by weight, preferably from 5 to 80% by weight and particularly preferably from 10 to 50% by weight, based on the total weight of the ink. Further constituents of the inks are catalysts, ionomer materials and water, preferably deionized water. The proportion of water in the inks is in the range from 1 to 50% by weight, preferably from 5 to 25% by weight, based on the total weight of the ink.

Apart from these components, the ink of the invention can additionally contain additives such as binders, cosolvents, wetting agents, antifoaming agents, surfactants, anti-settling agents, preservatives, pore formers, leveling agents, stabilizers, pH modifiers and other substances. Furthermore, basic agents such as sodium hydroxide (NaOH) or potassium hydroxide (KOH) can be added for buffering of the acid groups of the ionomer.

To produce the ink of the invention, the components precious metal containing catalyst (e.g. 50% by weight Pt/C, Pt black, PtRu black, etc), liquid ionomer composition (e.g. Nafion® solution from DuPont), deionized water and the organic solvent (tertiary alcohol, aliphatic diketone or a mixture thereof) are weighed into a suitable vessel and dispersed or homogenized. As dispersion equipment, use is made of apparatuses for generating high shear forces (high-speed stirrers, roll mills, bead mills, etc.).

The ink of the invention can be applied directly to an ionomer membrane. However, it can also be applied to commercial gas diffusion layers (e.g. carbon fibre papers, carbon fibre nonwovens, GDLs, backings) or to other substrate materials (e.g. polymer films). For this purpose, it is possible to use various coating processes such as doctor blade coating, spraying, rolling, brushing, screen printing, stencil printing or offset printing. Suitable coating processes are described, for example, in U.S. Pat. No. 5,861,222.

After drying (generally at temperatures in the range from 50 to 150° C.), the catalyst layers adhere well to all customary substrate materials, in particular to ionomer membranes.

The ionomer membrane generally comprises proton-conducting polymer materials. Preference is given to using a tetrafluoroethylene-fluorovinyl ether copolymer bearing acid functions, in particular sulphonic acid groups. Such materials are marketed, for example, under the trade names Nafion® (DuPont) or Flemion® (Asahi Glass Co.). However, it is also possible to use other, in particular fluorine-free, ionomer materials such as sulphonated polyether ketones or aryl ketones or polybenzimidazoles. In addition, ceramic membranes and other high-temperature membranes can also be used.

Generally, the ionomer materials in the ink should be used in a liquid composition, i.e. dissolved or dispersed in a suitable solvent. Many fluorine-containing ionomer materials can be obtained in the form of an aqueous solution in various concentrations. The ionomer content of the solutions is usually in the range from 5 to 30% by weight, based on the total weight of the solution. Furthermore, ionomer materials supplied in the form of aqueous dispersions may also be used. Such dispersions are for example sold by DuPont under the name "Nafion® PFSA polymer dispersions" and usually have an ionomer content in the range from 5 to 30% by weight (based on the total weight of the dispersion).

In addition, ionomers having different equivalent weights (EWs) are also offered by various manufacturers.

As catalyst materials, it is possible to use all electrocatalysts known in the field of fuel cells. In the case of supported catalysts, finely divided, electrically conductive carbon is used as support, with preference being given to using carbon blacks or graphites. Catalytically active components employed are the elements of the platinum group of the Periodic Table (Pt, Pd, Ag, Au, Ru, Rh, Os, Ir) or alloys thereof. The catalytically active metals can contain further alloying additions such as cobalt, chromium, tungsten or molybdenum. Use is generally made of supported catalysts (e.g. 50% by weight Pt/C) in which the catalytically active platinum group metals have been applied in finely divided form to the surface of a conductive carbon support. However, unsupported catalysts such as platinum blacks or platinum powders having a high surface area can also be used for producing the electrode layers. Suitable electrocatalysts are described in EP 743 092 B1 and DE 44 43 701.

Depending on the thickness of the catalyst layer, concentrations per unit area of from 0.05 to 5 mg of precious metal/$cm^2$ are possible in the reaction layers. The thickness of the catalyst layers after drying is about 5-100 microns, preferably 5-50 microns.

To determine the electrical performance in the fuel cell, a membrane-electrode assembly produced using the catalyst inks of the invention is examined in the PEM full cell test. Here, the PEM fuel cell is operated using hydrogen and air (pressure: 3 bar) and the characteristic curve (voltage/current density curve) is determined. From this characteristic curve, the cell voltage at a current density of 500 m A/$cm^2$ is determined as a measure of the electrocatalytic performance of the cell.

The following examples illustrate the invention:

EXAMPLES

Example 1

The following components were weighed out and homogenized by means of a dispersion apparatus:

| | |
|---|---|
| 0.75 g | of supported Pt catalyst (50% Pt/C, from Umicore, Hanau) |
| 3.25 g | of Nafion ® solution (11.3% in water, from DuPont, USA) |
| 9.00 g | of water (deionized) |
| 12.00 g | of 4-hydroxy-4-methyl-2-pentanone (from Merck-Schuchardt, Hohenbrunn/Munich) |
| 25.00 g | |

The weight ratio of catalyst/Nafion® in this ink is about 2:1. The ink was applied by spraying to the anode side and cathode side of a Nafion® NR 111 ionomer membrane (from DuPont, USA) in the form of a square having an edge length of 7.07 cm (active cell area: 50 $cm^2$) and subsequently dried at 90° C. The adhesion of the catalyst layers to the ionomer membrane was found to be very good. Post-treatment of the catalyst-coated membrane (CCM) to remove any decomposition products did not have to be carried out. After drying, the CCM was placed between two gas diffusion layers (TGPH-060, from Toray, Japan) and measured in a PEM full cell in hydrogen/air operation. At a current density of 500 mA/$cm^2$, a cell voltage of 762 mV was measured (power density: 0.38 W/$cm^2$). The total Pt loading (anode and cathode) was 0.44 mg of Pt/$cm^2$.

Example 2

The following components were weighed out and homogenized by means of a dispersion apparatus:

| | |
|---|---|
| 3.00 g | of supported Pt catalyst (50% Pt/C, from Umicore, Hanau) |
| 13.275 g | of Nafion ® solution (11.3% in water, from DuPont, USA) |
| 6.70 g | of water (deionized) |
| 17.25 g | of tert-butanol (from Merck, Darmstadt) |
| 40.225 g | |

The ink was applied by screen printing to two gas diffusion layers (type Sigracet 21BC; from SGL, Meitingen, Del.) in the form of a square having an edge length of 7.07 cm (active cell area: 50 $cm^2$) and subsequently dried. Irrigation of the electrodes to remove residues was dispensed with. An ionomer membrane (thickness: 50 microns) was placed between the two electrodes and the combination was subsequently pressed to form a fife-layer membrane-electrode assembly (MEA). The total Pt loading was 0.54 mg of Pt/$cm^2$. The MEA produced in this way was measured in the PEM full cell test. At a current density of 500 mA/$cm^2$, a cell voltage of 700 mV was obtained (power density: 0.35 W/$cm^2$).

Example 3

The following components were weighed out and homogenized:

| | |
|---|---|
| 0.50 g | of supported Pt catalyst (50% Pt/C, from Umicore, Hanau) |
| 2.20 g | of Nafion ® solution (11.3% in water, from DuPont, USA) |
| 2.20 g | of water (deionized) |
| 19.60 g | of 2,5-hexanedione (from Merck-Schuchardt, Hohenbrunn/Munich) |
| 24.50 g | |

The ink was applied by spraying to the anode side and cathode side of a Nafion® NR 111 ionomer membrane (from DuPont, USA) in the form of a square having an edge length of 7.07 cm (active cell area: 50 $cm^2$) and subsequently dried at 90° C. The adhesion of the catalyst layers to the ionomer membrane was found to be very good. After-treatment of the catalyst-coated membrane (CCM) to remove any decomposition products did not have to be carried out. After drying, the CCM was placed between two gas diffusion layers (TGPH-060, from Toray, Japan) and measured in a PEM full cell in hydrogen/air operation. Very good results were achieved. The total Pt loading was 0.44 mg of Pt/$cm^2$.

Example 4

The following components were weighed out and homogenized:

| | |
|---|---|
| 5.00 g | of supported Pt catalyst (50% Pt/C, from Umicore, Hanau) |
| 22.12 g | of Nafion ® PFSA polymer dispersion DE 1020 (11% in water, from DuPont, USA) |
| 100.00 g | of tert-butanol (from Merck, Darmstadt) |
| 42.88 g | of water (deionized) |
| 170.00 g | |

For testing of storage stability, the ink made according to example 4 was stored in a sealed container for 64 days (i.e. more than 2 months) at room temperature. A GC analysis (using quantitative gas chromatographic methods) was run at the beginning and at the end of the storage period to detect the tert-butanol content of the ink.

| | |
|---|---|
| Begin (0 days): | 58.8 wt.-% tert-butanol (based on the total weight of the ink) |
| After 64 days: | 57.1 wt.-% tert-butanol |
| Oxidation products: | none detected |

This result shows that no decomposition or degradation of the ink solvent occurs. The content of tert-butanol remains nearly constant, thus documenting the high storage stability of the ink solvent of the present invention.

The invention claimed is:

1. Ink for producing catalyst layers for electrochemical devices, which comprises catalyst material, ionomer material, water and at least one organic solvent selected from the group consisting of 2,3-dimethyl-2,3-butanediol; 2,4-dimethyl-2,4-pentanediol; 2,4-dimethyl-2,4-hexanediol; 2,5-dimethyl-2,5-hexanediol; 3-hydroxy-3-methyl-2-butanone; 4-hydroxy-4-methyl-2-pentanone (diacetone alcohol) and mixtures thereof.

2. Ink according to claim 1, wherein the organic solvent is present in the ink in an amount of from 1 to 90% by weight, preferably from 5 to 80% by weight and particularly preferably from 10 to 50% by weight, based on the total weight of the ink.

3. Ink according to claim 1, wherein water is present in an amount of from 1 to 50% by weight, preferably from 5 to 25% by weight, based on the total weight of the ink.

4. Ink according to claim 1, wherein the ionomer material comprises a tetrafluoroethylene-fluoro-vinyl ether copolymer bearing acid functions, in particular sulphonic acid groups.

5. Ink according to claim 1, wherein the ionomer material is used in an aqueous solution having an ionomer content of from 5 to 30% by weight (based on the total weight of the solution).

6. Ink according to claim 1, wherein the ionomer material is used in an aqueous dispersion having an ionomer content of from 5 to 30% by weight (based on the total weight of the dispersion).

7. Ink according to claim 1, wherein the organic solvent is miscible with water, preferably completely miscible with water.

8. Ink according to claim 1, wherein the catalyst material comprises supported catalysts comprising finely divided, electrically conductive carbon black and, as catalytically active components, elements of the platinum group of the Periodic Table (i.e. Pt, Pd, Ag, Au, Ru, Rh, Os, Ir) or mixtures or alloys thereof.

9. Ink according to claim 1, wherein the catalyst material comprises finely divided blacks or powders of the elements of the platinum group of the Periodic Table (i.e. Pt, Pd, Ag, Au, Ru, Rh, Os, Ir) or mixtures or alloys thereof.

10. Ink according to claim 1 which further comprises an additive selected from the group consisting of wetting agents, antifoaming agents, surfactants, anti-settling agents, preservatives, pore formers, leveling agents, stabilizers, pH modifiers, sodium hydroxide (NaOH) and potassium hydroxide (KOH).

11. A catalyst-coated ionomer membrane for fuel cells which comprises the ink of claim 1.

12. A gas diffusion electrode for fuel cells which comprises the ink of claim 1.

13. A catalyst-coated substrate material which comprises the ink of claim 1.

14. Ink for producing catalyst layers for electrochemical devices, which comprises catalyst material, ionomer material, water and at least one organic solvent bearing functional groups which are stable to oxidative degradation, wherein the organic solvent is selected from the class of aliphatic diketones.

15. Ink according to claim 14, wherein the organic solvent is selected from the group consisting of 2,3-butanedione (diacetyl), 2,3-pentanedione (ethylmethylglyoxal), 2,4-pentanedione (acetylacetone), 2,3-hexanedione, 2,4-hexanedione, 3,4-hexanedione, 2,5-hexanedione, 2,6-heptanedione, 3-methyl-2,5-hexanedione, 3-ethyl-2,5-hexanedione and mixtures thereof.

16. Ink for producing catalyst layers for electrochemical devices, which comprises catalyst material, ionomer material, water and at least one organic solvent, wherein the organic solvent is a mixture of solvents from the class of tertiary alcohols and from the class of aliphatic diketones.

* * * * *